(12) United States Patent
Sun et al.

(10) Patent No.: US 6,589,677 B1
(45) Date of Patent: Jul. 8, 2003

(54) SILICON BASED SUBSTRATE WITH ENVIRONMENTAL/THERMAL BARRIER LAYER

(75) Inventors: Ellen Y. Sun, South Windsor, CT (US); Harry E. Eaton, Woodstock, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/033,955

(22) Filed: Dec. 19, 2001

(51) Int. Cl.⁷ .................. B32B 15/04; B32B 9/00; F03B 3/12
(52) U.S. Cl. .................. 428/698; 428/469; 428/697; 428/699; 428/701; 428/702; 428/446; 428/448; 428/660; 428/680; 428/681; 416/241 B
(58) Field of Search ................. 428/408, 469, 428/697, 698, 699, 701, 702, 446, 448, 660, 680, 681; 416/241 B, 241 R

(56) References Cited

U.S. PATENT DOCUMENTS 6,296,941 B1 * 10/2001 Eaton et al.
6,485,848 B1 * 11/2002 Wang et al.

FOREIGN PATENT DOCUMENTS

WO    WO 01/10795 A1    2/2001

* cited by examiner

Primary Examiner—Deborah Jones
Assistant Examiner—Jennifer McNeil
(74) Attorney, Agent, or Firm—Bachman & LaPointe, P.C.

(57) ABSTRACT

An article comprising a substrate containing silicon and at least one barrier layer which functions as a thermal barrier at temperatures in excess of 1300° C. in aqueous environments.

20 Claims, No Drawings

SILICON BASED SUBSTRATE WITH ENVIRONMENTAL/THERMAL BARRIER LAYER

BACKGROUND OF THE INVENTION

The present invention relates to an article comprising a substrate containing silicon and at least one barrier layer which functions as a thermal barrier and, more particularly, a layer which is effective at temperatures in excess of 1300° C. in aqueous environments.

Ceramic materials containing silicon and metal alloys containing silicon have been proposed for structures used in high temperature applications as, for example, gas turbine engines, heat exchangers, internal combustion engines, and the like. A particular useful application for these materials is for use in gas turbine engines which operate at high temperatures in aqueous environments. It has been found that these silicon containing substrates can recede and lose mass as a result of a formation volatile Si species, particularly $Si(OH)_x$ and SiO when exposed to high temperature, aqueous environments. For example, silicon carbide when exposed to a lean fuel environment of approximately 1 ATM pressure of water vapor at 1200° C. will exhibit weight loss and recession at a rate of approximately 6 mils per 1000 hrs.

Thermal layers for high temperature aqueous/steam environments have been developed which are useful at temperatures up to 1300° C. Naturally it would be highly desirable to have effective thermal barrier layers for silicon containing substrates which operate in aqueous environment at temperatures in excess of 1300° C.

Furthermore, it is not uncommon to use one or more layers on a substrate such as bond layers, intermediate barrier layers, and the like. It is important for the integrity of the final article to maintain a compatibility between the coefficient of thermal expansion (CTE) of the adjacent silicon containing substrate and/or the thermal barrier layer (s). If the CTE between adjacent layers and substrate are not compatible, the overall coating can break down at the interfaces between the non-compatible layers.

Accordingly, it is a principle object of the present invention to provide an article comprising the silicon containing substrate and at least one thermal barrier layer wherein the layer protects the silicon substrate when exposed to temperatures in excess of 1300° C. in aqueous environments and has a coefficient of thermal expansion which is compatible with the substrate when adjacent to the substrate and compatible with any other adjacent layer or layers.

Further objects and advantages of the present invention will appear hereinbelow.

SUMMARY OF THE INVENTION

The present invention relates to an article comprising a silicon containing substrate having at least one thermal barrier layer wherein the layer functions to both inhibit the formation of undesirable gaseous species of silicon when the article is exposed to a high temperature, aqueous environment and to provide thermal protection. By high temperatures is meant temperatures in excess of 1300° C. By aqueous environment is meant a water and/or steam environment. The silicon containing composite is preferably a ceramic or metal alloy containing silicon. The thermal barrier layer is characterized by a coefficient of thermal expansion which is within plus or minus 3.0 ppm per degree centigrade of the coefficient of thermal expansion (CTE) of the silicon containing substrate and/or any adjacent barrier layer.

The layers of the present invention contain $TaO_x$ (where x=1 to 3 and is a ratio of 0 to the compound element, see U.S. Pat. No. 4,155,016), for example, $Ta_2O_5$ and an oxide selected from the group consisting of MgO, CaO, SrO, BaO, $Al_2O_3$, $Y_2O_3$, $La_2O_3$, $Re_2O_3$ (where Re is a rare earth element) and mixtures thereof. It has been found in accordance with the present invention that $Ta_2O_5$ gives to the barrier layer the desired high temperature capability. The CTE compatibility is accomplished by providing a CTE tailoring additive in the layer in an amount sufficient to maintain the desired CTE compatibility with the substrate and adjacent layers. In this regard see co-pending Application Ser. No. 10/034,677, filed concurrently herewith. $NbO_x$ (where x=1 to 3 and is a ratio of 0 to the compound element, see U.S. Pat. No. 4,155,016) is, in accordance with the present invention, a suitable CTE tailoring additive.

In a preferred embodiment of the present invention the article can include one or more intermediate layers between the silicon based substrate and the thermal barrier layer. The intermediate layer(s) serve(s) to provide enhanced adherence between the barrier layer and the substrate and/or to prevent reactions between the barrier layer and the substrate. These layers contain, if necessary, the CTE tailoring additive so as to insure compatibility between the layers as noted above.

DETAILED DESCRIPTION

The present invention relates to an article comprising a silicon containing substrate and at least one thermal barrier layer having a thermal barrier additive which reduces the rate of weight loss and recession of the substrate at temperatures in excess of 1300° C. in aqueous environments where compared to the at least one barrier layer without the additive wherein the layer is effective at temperatures in excess of 1300° C. in aqueous environments.

According to the present invention, the silicon containing substrate may be a silicon containing ceramic substrate or a silicon containing metal alloy. In a preferred embodiment, the silicon containing substrate is a silicon containing ceramic material as, for example, silicon carbide, silicon nitride, silicon carbon nitride, silicon oxynitride and silicon aluminum oxynitride. In accordance with a particular embodiment of the present invention, the silicon containing ceramic substrate comprises a silicon containing matrix with reinforcement such as fibers, particles, and the like and, more particularly, a silicon based matrix which is fiber-reinforced. Particularly suitable ceramic substrates are a silicon carbide coated silicon carbide fiber-reinforced silicon carbide particle and silicon matrix, a carbon fiber-reinforced silicon carbide matrix and a silicon carbide fiber-reinforced silicon nitride matrix. Particularly useful silicon-metal alloys for use as substrates for the article of the present invention include molybdenum-silicon alloys, niobium-silicon alloys, and other Si containing alloys having a coefficient of thermal expansion compatible with the barrier layer of the present invention.

Barrier layers in accordance with the present invention contain $TaO_x$ and an oxide selected from the group consisting of MgO, CaO, SrO, BaO, $Al_2O_3$, $Y_2O_3$, $La_2O_3$ and $Re_2O_3$. The $TaO_x$ is present in an amount 10 to 75 wt. %, preferably 10 to 50 wt. % and ideally 10 to 30 wt. %. The preferred oxide for use in the barrier layer is selected from the group consisting of barium oxide, strontium oxide and mixtures thereof.

In order to insure CTE compatibility, the thermal barrier layer (and any other layer whether intermediate, top, bond, etc.) of the present invention include, if necessary, a CTE tailoring additive.

The CTE tailoring additive is selected from the group consisting of $NbO_x$ and $NbO_x$ plus an oxide selected from the group consisting of MgO, CaO, SrO, BaO, $Al_2O_3$, $Y_2O_3$, $La_2O_3$, rare earth oxides and mixtures thereof where x=1 to 3 (for example NbO, $Nb_2O_3$, $Nb_2O_5$). When the additive comprises $NbO_x$ with an oxide as set forth above, it may comprise the layer per se. In accordance with a preferred embodiment of the present invention, the CTE tailoring additive is added to a layer material for adjusting the CTE of the layer so as to make the layer compatible with the substrate and any other adjacent layers which may be employed. The CTE tailoring additive should be present in the layer in an amount sufficient to maintain compatibility between itself and adjacent layers and the substrate. When $NbO_x$ is added, for example to a barrier layer described above, it should be present in an amount of at least 5 wt. %, preferably between 5 wt. % and 50 wt. %. If the CTE additive comprises $NbO_x$ plus an oxide, it should be present in an amount of at least 2 wt. %, preferably between 2 wt. % and 40 wt. %. The critical feature is the presence of the CTE additive in amounts sufficient to provide the compatibility set forth below.

It is an important feature of the present invention to maintain compatibility between the coefficient of thermal expansion of the silicon containing substrate and the barrier layer and/or adjacent barrier layer. In accordance with the present invention it has been found that the coefficient of thermal expansion of the barrier layer should be within ±3.0 ppm per degrees centigrade, preferably ±0.5 ppm per degrees centigrade, of the coefficient of thermal expansion of the silicon containing substrate and/or adjacent barrier layer.

The thermal barrier layer should be present in the article at a thickness of greater than or equal to about 0.5 mils (0.0005 inch), preferably between about 3 to about 30 mils and ideally between about 3 to about 5 mils. The layer may be applied to the silicon based substrate by any suitable manner known in the art, however, it is preferable that the barrier layer be applied by thermal spraying.

When $TaO_x$ and $TaO_x$+oxide is present in the barrier layer without the CTE modifier, the layer may operate at temperatures up to 1450° C. The addition of the CTE modifier may limit high temperature applications to about 1350° C.

In a further embodiment of the article of the present invention, one or more intermediate layers can be provided between the silicon containing substrate and the barrier layer. The intermediate layer(s) serve(s) to provide enhanced adhesion between the barrier layer and the substrate and/or to prevent reactions between the barrier layer and the substrate. The one or more intermediate layers will contain, if necessary, the CTE tailoring additive in order to insure compatibility between adjacent layers. In this way an article is produced wherein CTE compatibility is insured regardless of whether there is a great degree of CTE incompatibility between the substrate on any preferred functional barrier layer by employing tailored intermediate barrier layers which bridge the CTE from the substrate to the, for example, top barrier layer. The thickness of the intermediate layer is typical to those described above with regard to the barrier layer and the intermediate layer may likewise be disposed in any manner known in the prior art.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. An article comprising:
   a substrate comprising silicon; and
   at least one barrier layer, wherein the at least one thermal barrier layer comprises $TaO_x$, where x=1 to 3, and an oxide selected from the group consisting of MgO, CaO, SrO, BaO, $Al_2O_3$, $Y_2O_3$, $La_2O_3$, $Re_2O_3$ (where Re is a rare earth element) and mixtures thereof in an amount sufficient to reduce the rate of weight loss and recession of the substrate at temperatures in excess of 1300° C. in aqueous environments where compared to the at least one barrier layer without the additive.

2. An article according to claim 1 wherein the substrate is selected from the group consisting of silicon containing ceramic and metal alloys containing silicon.

3. An article according to claim 2 wherein the substrate is a silicon containing ceramic selected from the group consisting of silicon carbide, silicon nitride, and silicon aluminum oxynitride.

4. An article according to claim 2 wherein the substrate is a composite comprising a silicon based matrix and a reinforcing particle.

5. An article according to claim 4 wherein said substrate is selected from the group consisting of silicon carbide fiber-reinforced silicon carbide matrix, carbon fiber-reinforced silicon carbide matrix and silicon carbide fiber-reinforced silicon nitride.

6. An article according to claim 2 wherein said substrate is a silicon containing metal alloy selected from the group consisting of molybdenum-silicon alloys, niobium silicon alloys, iron-silicon alloys, and iron-nickel-silicon based alloys.

7. An article according to claim 6 wherein said barrier layer comprises between 10 to 50 wt. % of $TaO_x$, balance said oxide.

8. An article according to claim 7 wherein the barrier layer further comprises a CTE tailoring additive.

9. An article according to claim 8 wherein the CTE tailoring additive is $NbO_x$, where x=1 to 3.

10. An article according to claim 2 wherein said barrier layer comprises up to 75 wt. % of $TaO_x$, balance, essentially said oxide.

11. An article according to claim 10 wherein the barrier layer further comprises a CTE tailoring additive.

12. An article according to claim 11 wherein the CTE tailoring additive is $NbO_x$, where x=1 to 3.

13. An article according to claim 1 including an intermediate layer between the substrate and the barrier layer.

14. An article according to claim 13 wherein the intermediate layer contains a CTE tailoring additive.

15. An article according to claim 14 wherein the CTE tailoring additive is $NbO_x$, where x=1 to 3.

16. An article according to claim 13 wherein the coefficient of thermal expansion of the intermediate layer is within ±3.0 ppm/° C. the coefficient of thermal expansion of the substrate and the barrier layer.

17. An article according to claim 13 wherein the coefficient of thermal expansion of the intermediate layer is within ±0.5 ppm/° C. the coefficient of thermal expansion of the substrate and the barrier layer.

18. An article according to claim 1 wherein the coefficient of thermal expansion of the barrier layer is within ±3.0 ppm/° C. the coefficient of thermal expansion of the substrate.

19. An article according to claim 1 wherein the coefficient of thermal expansion of the barrier layer is within ±0.5 ppm/° C. the coefficient of thermal expansion of the substrate.

20. An article according to claim 1, wherein the thermal barrier additive is present in an amount sufficient to reduce the rate of weight loss and recession at temperatures between 1350° C. and 1450° C.

* * * * *

UNITED STATES PATENT AND TRADEMARK OFFICE
CERTIFICATE OF CORRECTION

PATENT NO. : 6,589,677 B1  
DATED : July 8, 2003  
INVENTOR(S) : Ellen Y. Sun et al.

It is certified that error appears in the above-identified patent and that said Letters Patent is hereby corrected as shown below:

Column 1,  
Line 4, after the title and before BACKGROUND OF THE INVENTION, please insert the following:

-- U.S. GOVERNMENT RIGHTS

The invention was made with U.S. Government support under contract NAS3-98005 awarded by NASA. The U.S. Government has certain rights in the invention. --

Column 4,  
Line 46, after the word "balance" delete the ",".

Signed and Sealed this

Thirty-first Day of August, 2004

JON W. DUDAS  
*Director of the United States Patent and Trademark Office*